United States Patent
Huang et al.

(10) Patent No.: US 11,037,035 B2
(45) Date of Patent: Jun. 15, 2021

(54) MULTI-TASK LEARNING INCORPORATING DEPENDENCIES METHOD FOR BIONIC EYE'S FACE ATTRIBUTE RECOGNITION

(71) Applicant: BEIJING INSTITUTE OF TECHNOLOGY, Beijing (CN)

(72) Inventors: Qiang Huang, Beijing (CN); Xiaopeng Chen, Beijing (CN); Di Fan, Beijing (CN); Hyunwoo Kim, Beijing (CN); Xuechao Chen, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 42 days.

(21) Appl. No.: 16/431,546

(22) Filed: Jun. 4, 2019

(65) Prior Publication Data
US 2020/0387762 A1  Dec. 10, 2020

(51) Int. Cl.
*G06K 9/62* (2006.01)
*G06K 9/66* (2006.01)
*G06K 9/00* (2006.01)

(52) U.S. Cl.
CPC .......... *G06K 9/66* (2013.01); *G06K 9/00281* (2013.01); *G06K 9/00993* (2013.01)

(58) Field of Classification Search
CPC ... G06K 9/66; G06K 9/00281; G06K 9/00993
See application file for complete search history.

(56) References Cited

U.S. PATENT DOCUMENTS

2019/0244014 A1* 8/2019 Ranjan .............. G06K 9/00302

OTHER PUBLICATIONS

Jessica Irons, "Face identity recognition in simulated prosthetic vision is poor than previously reported and can be improved by caricaturing", Vision research (Year: 2017).*
Luigi Celona, "Fine-Grained Face Annotation Using Deep Multi-Task CNN", Department of Informatics, Systems and Communication, University of Milano-Bicocca. (Year: 2018).*

* cited by examiner

*Primary Examiner* — Dhaval V Patel
(74) *Attorney, Agent, or Firm* — Cantor Colburn LLP

(57) ABSTRACT

The application discloses a multi-task learning incorporating dependencies method for bionic eye's face attribute recognition, which is as follows: Determine the first face attribute and the second face attribute for attribute recognition of facial image. Obtain the first recognition task branch and the second recognition task branch. Establish the task dependency between the first recognition task branch and the second recognition task branch to obtain the first transformed face attribute fully connected layer related to the second face attribute. and the second transformed face attribute fully connected layer related to the first face attribute. Feed the first transformed face attribute fully connected layer into the prediction layer to predict the first face attribute of facial image. And feed the second transformed face attribute fully connected layer into the prediction layer to predict the second face attribute of facial image. The multi-task learning incorporating dependencies method for bionic eye's face attribute recognition will be obtained according to the above steps.

13 Claims, 4 Drawing Sheets

Figure 1:
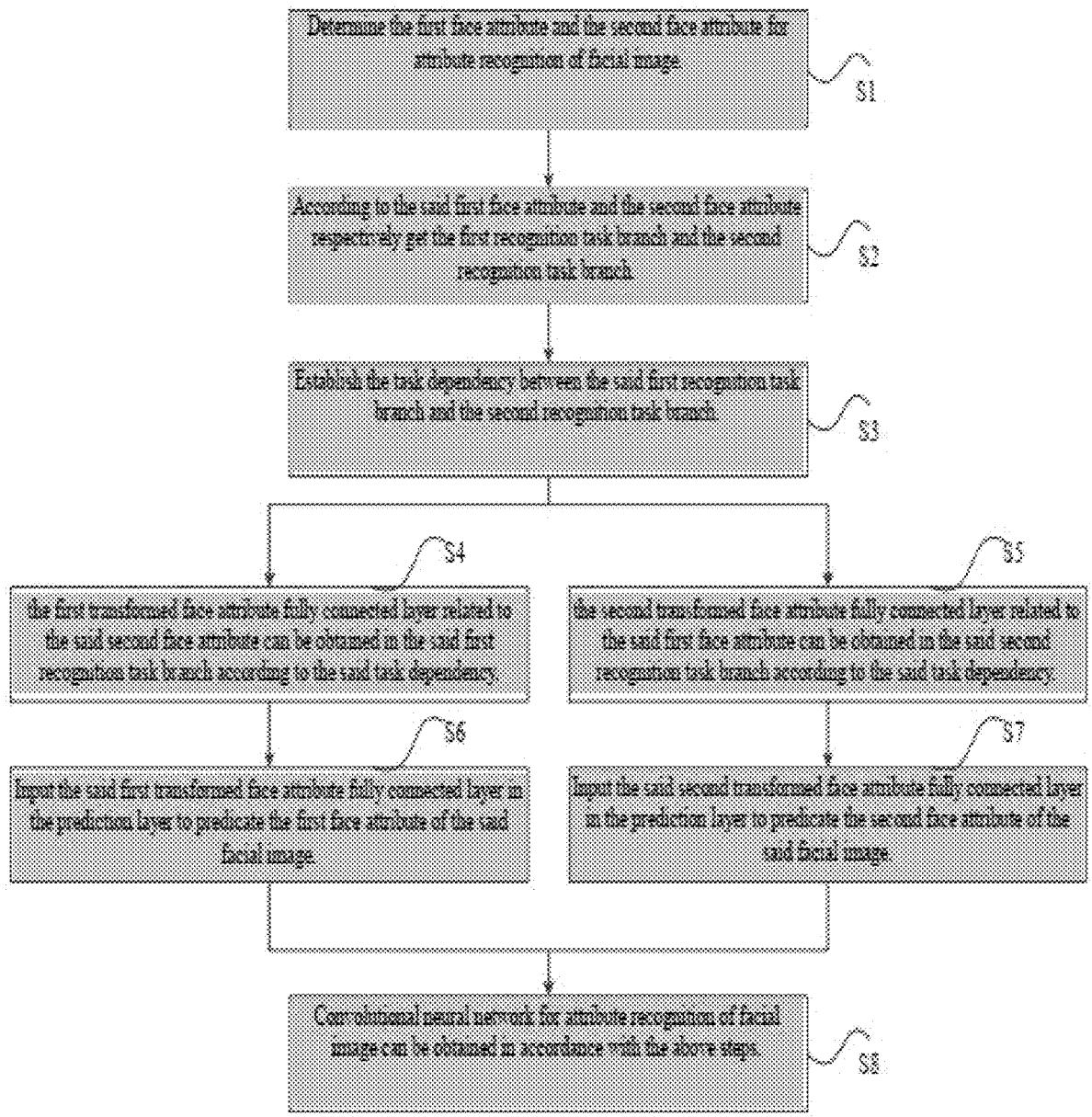

MULTI-TASK LEARNING INCORPORATING DEPENDENCIES METHOD FOR BIONIC EYE'S FACE ATTRIBUTE RECOGNITION

TECHNICAL FIELD

The application involves with the face recognition technology field, more specifically, the multi-task learning incorporating dependencies method for bionic eye's face attribute recognition.

BACKGROUND TECHNOLOGY

Face attribute (smile, gender, age, etc.) recognition technology is of great importance in practical applications in human-computer interaction, face verification, video monitoring, etc. Posture of human face, sunlight, scale, occlusion and other factors increase the difficulty of face attribute recognition. Face attribute recognition technology has become a hot and challenging research topic. The research on face attribute recognition can improve bionic eye's human-computer interaction capacity.

In recent years, the use of the deep convolutional neural network has improved the performance of face attribute recognition. Chen, etc. (Chen J, Ou Q, Chi Z, et al. Smile detection in the wild with deep convolutional neural networks [J]. Machine vision and applications, 2017, 28 (1-2): 173-183.), Mansanet, etc. (Mansanet J, Albiol A, Paredes R. Local deep neural networks for gender recognition [J]. Pattern Recognition Letters, 2016, 70: 80-86.), Rothe, etc. (Rothe R, Timofte R, Van Gool L. Dex: Deep expectation of apparent age from a single image [C]//Proceedings of the IEEE International Conference on Computer Vision Workshops. 2015: 10-15. Respectively use the deep convolutional neural network to recognize smile, gender and age. In the above-said networks, smile, gender and age are recognized separately, but their intrinsic connection is ignored. Multi-task learning is able to improve the performance of the single task by conducting combination learning for tasks with relevance. Traditional multi-task learning learns the general expression through sharing parameters in sharing layer and special-task expression through special-task layer. However, the relevance between tasks is ignored in special-task layer, so the task dependency between face attributes is not adequately used in traditional multi-task learning network. In multi-task learning, when the task recognition rate (as a condition) is high, other tasks can be stated with conditional probability. Yoo, etc. (Yoo B I, Kwak Y, Kim Y, et al. Deep facial age estimation using conditional multitask learning with weak label expansion [J]. IEEE Signal Processing Letters, 2018, 25 (6): 808-812. Use gender recognition as the condition in multi-task learning (gender recognition gained a recognition rate of 98% in MORPH-II date set), and then use conditional probability to state the task of age recognition. However, when the gender recognition (as a condition) cannot gain a high recognition rate on other data set, conditional probability can no longer be used to state the age recognition task.

As to the failure to obtain high recognition rate owing to the negligence of relevance between tasks in multi-task learning in related technologies and the inadequate use of task dependency between face attributes in traditional multi-task learning network, there is no efficient solutions being put forward at present.

CONTENTS OF THE INVENTION

The application aims mainly to provide the multi-task learning incorporating dependencies method for bionic eye's face attribute recognition to solve the problem of failure to obtain high recognition rate owing to the negligence of relevance between tasks in multi-task learning in related technologies and the inadequate use of task dependency between face attributes in traditional multi-task learning network.

In order to reach the above-said goal, an aspect of the application provides the multi-task learning incorporating dependencies method for bionic eye's face attribute recognition.

According to the application, the multi-task learning incorporating dependencies method for bionic eye's face attribute recognition includes:

Determine the first face attribute and the second face attribute for attribute recognition of facial image.

According to the said first face attribute and the second face attribute respectively get the first recognition task branch and the second recognition task branch.

Establish the task dependency between the said first recognition task branch and the second recognition task branch.

The first transformed face attribute fully connected layer related to the said second face attribute can be obtained in the said first recognition task branch according to the said task dependency. And The second transformed face attribute fully connected layer related to the said first face attribute can be obtained in the said second recognition task branch according to the said task dependency.

Feed the said first transformed face attribute fully connected layer into the prediction layer to predict the first face attribute of the said facial image. And feed the said second transformed face attribute fully connected layer into the prediction layer to predict the second face attribute of the said facial image.

The multi-task learning incorporating dependencies method for bionic eye's face attribute recognition will be obtained according to the above steps.

Further, such as the above-said the multi-task learning incorporating dependencies method for bionic eye's face attribute recognition, in the first recognition task branch and the second recognition task branch gained according to the said first face attribute and the second face attribute, which includes:

Determine the sharing layer applicable to all face attributes in the baseline network used for attribute recognition.

Determine the first residual block and the second residual block corresponding to the said first face attribute and the second face attribute in baseline network, and then connect them to the sharing layer.

Determine the first fully connected layer and the second fully connected layer corresponding to the said first face attribute and the second face attribute.

Connect the said first and second fully connected layers separately to the first and second residual blocks.

Further, such as the above-said the multi-task learning incorporating dependencies method for bionic eye's face attribute recognition, the task dependency established between the said first recognition task branch and the second recognition task branch, which includes:

Generate the first attention module corresponding to the said first face attribute and the second attention module corresponding to the said second face attribute.

deal with the said second fully connected layer in accordance with the said first attention module to obtain the first face attribute representation unit related to the said second face attribute. And deal with the said second fully connected layer in accordance with the said first attention module to obtain the second face attribute representation unit related to the said first face attribute.

Further, such as the above-said the multi-task learning incorporating dependencies method for bionic eye's face attribute recognition, the said first fully connected layer is dealt with in accordance with the said second attention module to obtain the first face attribute expression unit related to the said second face attribute, which includes:

Feed all the first face attribute representation units in the said first fully connected layer and the No. i second face attribute representation unit in the second fully connected layer into the No. i second face attribute attention module in the said second attention module to learn the No. i first face attribute representation unit related to the said second face attribute.

Further, such as the above-said the multi-task learning incorporating dependencies method for bionic eye's face attribute recognition, the said second fully connected layer is dealt with in accordance with the said first attention module to obtain the second face attribute representation unit related to the said first face attribute, which includes:

Feed all the second face attribute representation units in the said second fully connected layer and the No. i first face attribute representation unit in the first fully connected layer into the No. i first face attribute attention module in the said first attention module to learn the second face attribute expression unit related to the No. i said first face attribute.

Further, such as the above-said the multi-task learning incorporating dependencies method for bionic eye's face attribute recognition, the first transformed facial attribute fully connected layer related to the said second face attribute is obtained in accordance with task dependency in the said first recognition task branch, which includes:

Concatenate the first face attribute representation units related to all the said second face attributes to generate the first transformed fully connected layer, and then use the said first transformed face attribute fully connected layer as the first transformed face attribute fully connected layer.

Further, such as the above-said the multi-task learning incorporating dependencies method for bionic eye's face attribute recognition, the second transformed facial attribute fully connected layer related to the said first face attribute is obtained in accordance with task dependency in the said second recognition task branch, which includes:

Concatenate the second face attribute representation units related to all the said first face attributes to generate the second transformed fully connected layer, and then use the said second transformed face attribute fully connected layer as the second transformed face attribute fully connected layer.

Further, such as the above-said the multi-task learning incorporating dependencies method for bionic eye's face attribute recognition, the said first transformed face attribute fully connected layer is fed into the prediction layer to predict the first face attribute of facial images, which includes:

Predict the first face attribute by feeding the said first transformed face attribute fully connected layer into softmax layer, and then obtain the first face attribute prediction probability.

Further, such as the above-said the multi-task learning incorporating dependencies method for bionic eye's face attribute recognition, the said second transformed face attribute fully connected layer is fed into the prediction layer to predict the second face attribute of facial images, which includes:

Predict the second face attribute by feeding the said second transformed face attribute fully connected layer into softmax layer, and then obtain the second face attribute prediction probability.

Further, such as the above-said the multi-task learning incorporating dependencies method for bionic eye's face attribute recognition, all the first face attribute representation units in the said first fully connected layer and the No. i second face attribute representation unit in the second fully connected layer are entered into the No. i second face attribute attention module in the said second attention module to learn the No. i first face attribute representation unit related to the said second face attribute, which include:

Score the relevance between the No. j first face attribute representation unit $x_{sj}$ in the first fully connected layer FCs and the No. i second face attribute context unit $C_{Gi}$ in the second fully connected layer in accordance with the following scoring function:

$$score(x_{sj}, C_{Gi}) = \tanh(W_s x_{sj} + W_G C_{Gi});$$

in which, the No. i second face attribute context unit $C_{Gi}$ in the said second fully connected layer refers to the No. i second face attribute expression unit $x_{Gi}$ in the said second fully connected layer;

Use probability $P(d_1 = j | x_s, C_{Gi})$ to show the relative importance of $x_{sj}$ based on $C_{Gi}$, in which $d_1$ refers to the importance of xs based on $C_{Gi}$ of all the first face attribute representation units; In which $P(d_1 = j | x_s, C_{Gi})$ can be calculated using relevance scoring function in accordance with the following equation:

$$P(d_1 = j | x_S, C_{G_i}) = \frac{\exp(score(x_{S_j}, C_{G_i}))}{\sum_{j=1}^{K} \exp(score(x_{S_j}, C_{G_i}))};$$

$P(d_1 | x_s, C_{Gi})$ refers to importance probability distribution, and it can be calculated as follows:

$$P(d_1 | x_s, C_{Gi}) = [P(d_1 = j | x_s, C_{Gi})]_{j=1}^{64};$$

The first face attribute representation unit related to the No. i said second face attribute $\hat{S}_i$ in the first transformed face attribute fully connected layer $FC_{S/C_G}$ can be calculated in accordance with the following formula:

$$\hat{S}_i = E_{x_S \sim P(d_1 | x_S, C_{G_i})}(x_S) = \sum_{j=1}^{64} P(d_1 = j | x_S, C_{G_i}) x_{S_j}.$$

Further, such as the above-said the multi-task learning incorporating dependencies method for bionic eye's face attribute recognition, all the second face attribute expression units in the said second fully connected layer and the No. i first face attribute representation unit in the first fully connected layer are entered into the No. i first face attribute attention module in the said first attention module to learn the second face attribute representation unit related to the No. i said first face attribute, which include:

Score the relevance between the No. j second face attribute representation unit $x_{Gj}$ in the second fully connected layer $FC_G$ and the No. i first face attribute context unit $C_{Si}$ in the first fully connected layer in accordance with the following scoring function:

$$\text{score}(x_{G_i}, C_{S_i}) = \tanh(W_G x_{G_i} + W_{ss});$$

in which, the No. i first face attribute context unit $C_{Si}$ in the said first fully connected layer refers to the No. i first face attribute expression unit $x_{S_i}$ in the said first fully connected layer;

Use probability $P(d_2=j|x_G, C_{S_i})$ to show the relative importance of $x_{sj}$ based on $C_{Gi}$, in which $d_2$ refers to the importance of $x_G$ based on $C_{Si}$ of all the first face attribute expression units; In which $P(d_2=j|x_G, C_{S_i})$ can be calculated using relevance scoring function in accordance with the following equation:

$$P(d_2 = j \mid x_G, C_{S_i}) = \frac{\exp(\text{score}(x_{G_j}, C_{S_i}))}{\sum_{j=1}^{K} \exp(\text{score}(x_{G_j}, C_{S_i}))};$$

$P(d|x_G, C_{S_i})$ refers to importance probability distribution, and it can be calculated as follows:

$$P(d_2|x_G, C_{S_i}) = [P(d_2=j|x_G, C_{S_i})]_{j=1}^{64};$$

The first face attribute representation unit related to the No. i said second face attribute $\hat{G}_i$ in the second transformed face attribute fully connected layer $FC_{G|C_s}$ can be calculated in accordance with the following formula:

$$\hat{G}_i = E_{x_G \sim P(d_2|x_G, C_{S_i})}(x_G) = \sum_{j=1}^{64} P(d_2 = j \mid x_G, C_{S_i}) x_{G_j} \circ$$

Further, such as the above-said the multi-task learning incorporating dependencies method for bionic eye's face attribute recognition, that after obtaining convolutional neural network, which includes:

Enter training set into the said convolutional neural network and then train it through the constructed loss function.

Further, such as the above-said the multi-task learning incorporating dependencies method for bionic eye's face attribute recognition, training of the said convolutional neural network through loss function includes:

Train the first recognition task branch and the second recognition task branch with cross entropy loss function, and the loss function Ls related to the said first recognition task branch is shown in the equation below:

$$L_s = -s \cdot \log(p_s) - (1-s) \cdot \log(1-p_s);$$

$p_s$ refers to the probability of one facial image predicted by the first face attribute in the said training set; s refers to judging information about the first face attribute in the said facial image, which is 0 or 1;

And the loss function equation $L_G$ related to the said second recognition task branch is shown as below:

$$L_G = -g \cdot \log(p_s) - (1-g) \cdot \log(1-p_g);$$

$p_g$ refers to the probability of one facial image predicted by the second face attribute in the said training set; g refers to judging information about the second face attribute in the said facial image, which is 0 or 1;

Obtain the total loss function equation L by weighting the said loss functions $L_S$ and $L_G$, which is shown below:

$$L = \lambda_s \cdot L_s + \lambda_g \cdot L_G;$$

$\lambda_s$ and $\lambda_g$ are weighting parameters corresponding to smile recognition and gender recognition.

In order to reach the above-said goal, the application provides the multi-task learning incorporating dependencies network for bionic eye's face attribute recognition.

According to the application, the multi-task learning incorporating dependencies network for bionic eye's face attribute recognition includes:

Task branch layer used in determining the first face attribute and the second face attribute for attribute recognition of facial image. And According to the said first face attribute and the second face attribute respectively get the first recognition task branch and the second recognition task branch.

Relevance establishing layer is used to establish task dependency between the said first recognition task branch and the second recognition task branch;

The transformed face attribute fully connected layer is used for the first transformed face attribute fully connected layer related to the said second face attribute in accordance with task dependency; And Obtain the second transformed face attribute fully connected layer related to the said first face attribute in accordance with the said task dependency;

Feed the said first transformed face attribute fully connected layer into the prediction layer to predict the first face attribute of the said facial image. And feed the said second transformed face attribute fully connected layer into the prediction layer to predict the second face attribute of the said facial image.

In the embodiments of the application, the multi-task learning incorporating dependencies method for bionic eye's face attribute recognition is used, which includes: Determine the first face attribute and the second face attribute for attribute recognition of facial image. According to the said first face attribute and the second face attribute respectively get the first recognition task branch and the second recognition task branch. Establish the task dependency between the said first recognition task branch and the second recognition task branch. the first transformed face attribute fully connected layer related to the said second face attribute can be obtained in the said first recognition task branch according to the said task dependency. And the second transformed face attribute fully connected layer related to the said first face attribute can be obtained in the said second recognition task branch according to the said task dependency. Feed the said first transformed face attribute fully connected layer into the prediction layer to predict the first face attribute of the said facial image. And feed the said second transformed face attribute fully connected layer into the prediction layer to predict the second face attribute of the said facial image. Convolutional neural network for attribute recognition of facial image can be obtained in accordance with the above steps. Therefore, the task dependency between different special-task branches is built to establish specific task dependency, and then the recognition performance of each task for face attribute can be improved greatly. Meanwhile, if the solution in the application is used on device with bionic eye, the human-computer interaction capacity of the device can be also increased greatly.

DESCRIPTION OF ATTACHED FIGURE

The attached figures, as a part of the application, are used to help further understand the application, so that the application's other features, purpose and advantages can be more explicit. The schematic attached figures of embodiment in the application and its illustration are only used for the interpretation of the application, which are not improper limitations for the application. In attached figures:

FIG. 1 refers to one kind of embodiment in the application.

Figure 2:
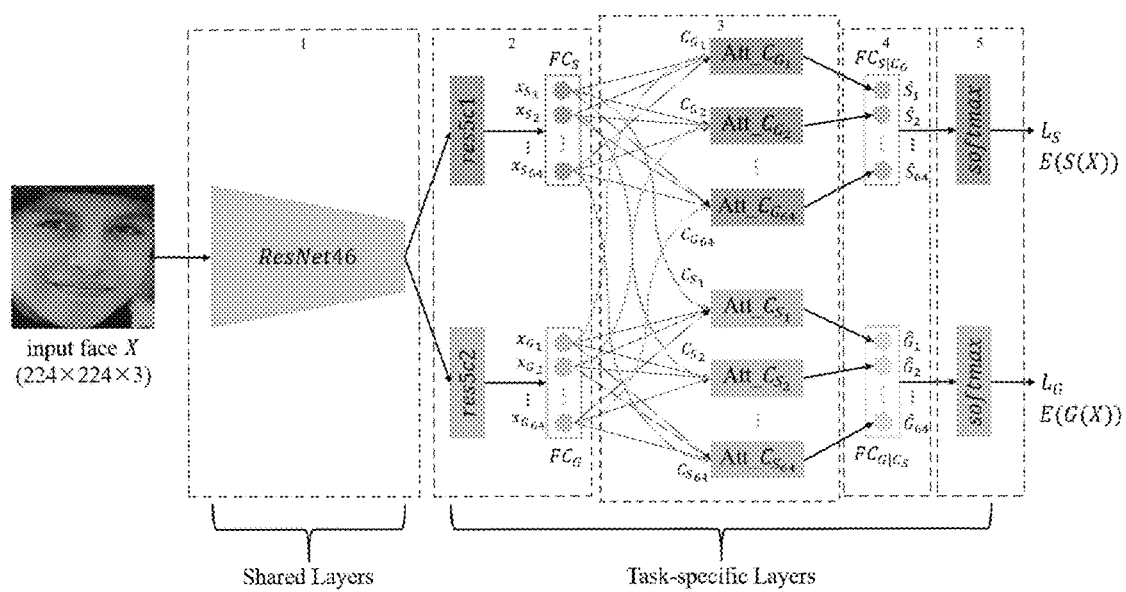

FIG. 2 refers to a multi-task learning convolutional neural network frame diagram for one embodiment in the application.

Figure 3:
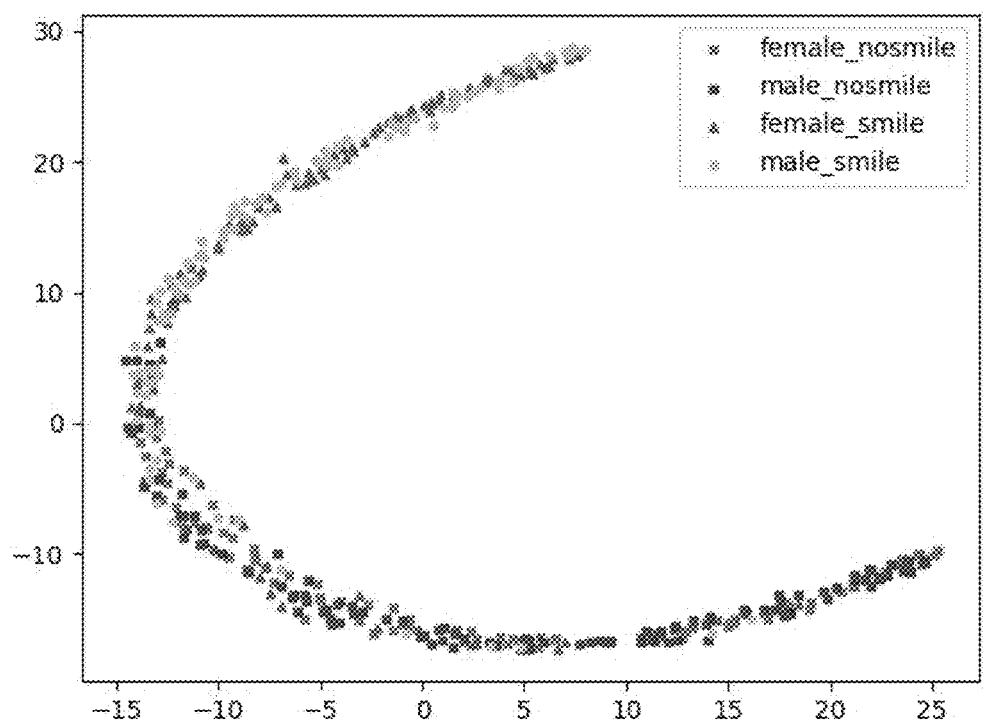

FIG. 3 refers to the representation feature distribution t-SNE visualization map of fully connected layer FCs in the method put forward in the invention based on the verification set of the randomly sampled FotW date set, in an embodiment of the application.

Figure 4:
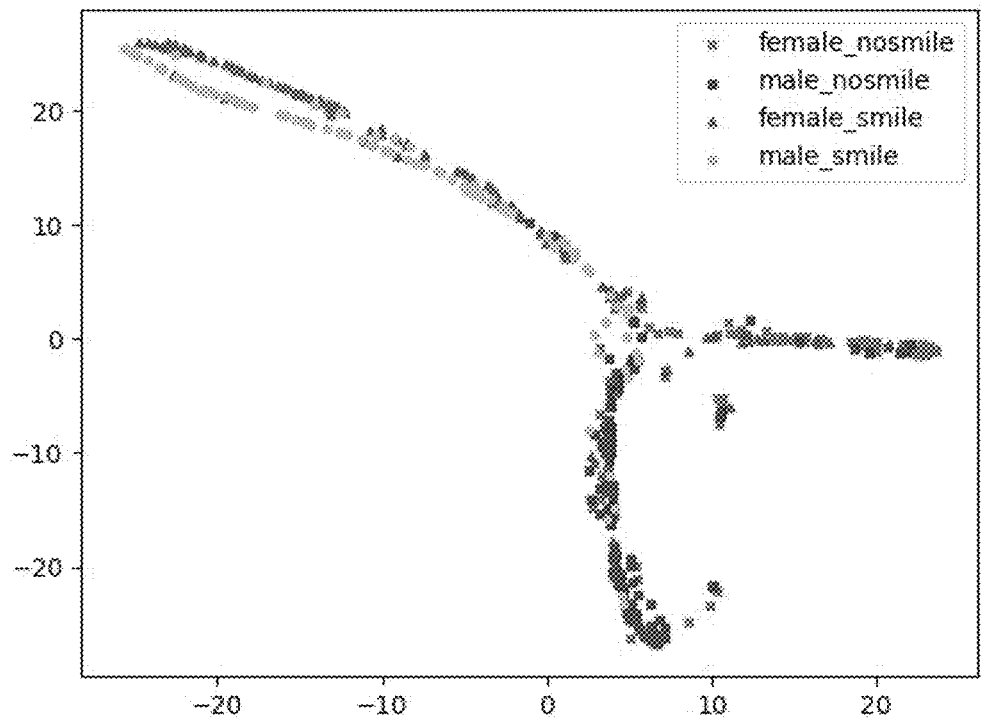

FIG. 4 refers to the representation feature distribution t-SNE visualization map of transformed gender related fully connected layer $FC_{SIC_G}$ in the method put forward in the invention based on the verification set of the randomly sampled FotW date set.

Figure 5:
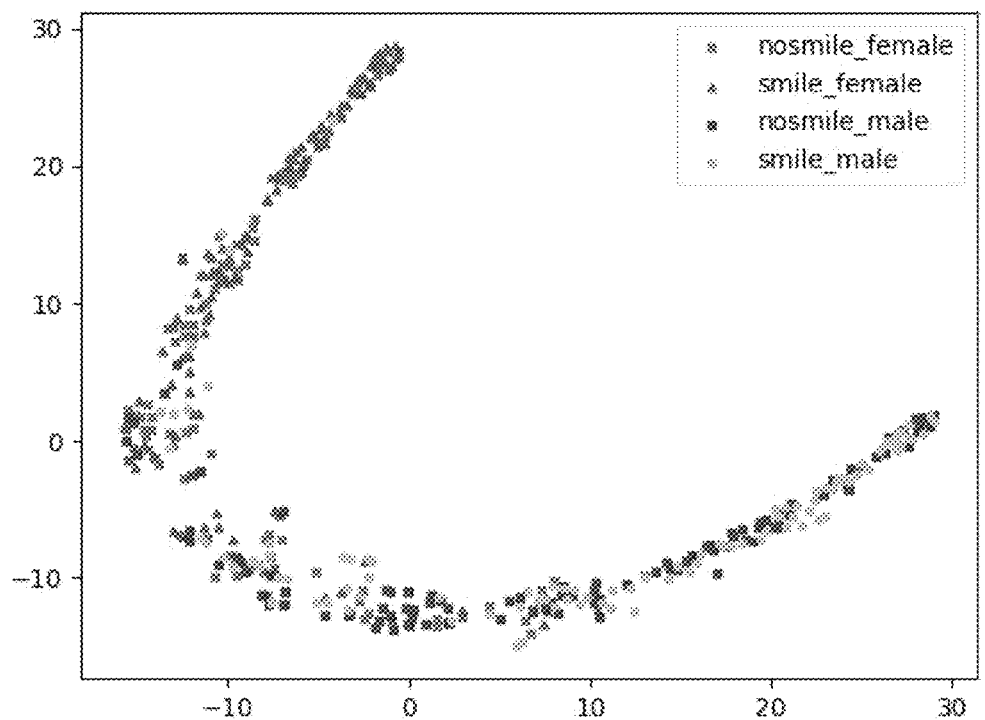

FIG. 5 refers to the representation feature distribution t-SNE visualization map of fully connected layer $FC_G$ in the method put forward in the invention based on the verification set of the randomly sampled FotW date set.

Figure 6:
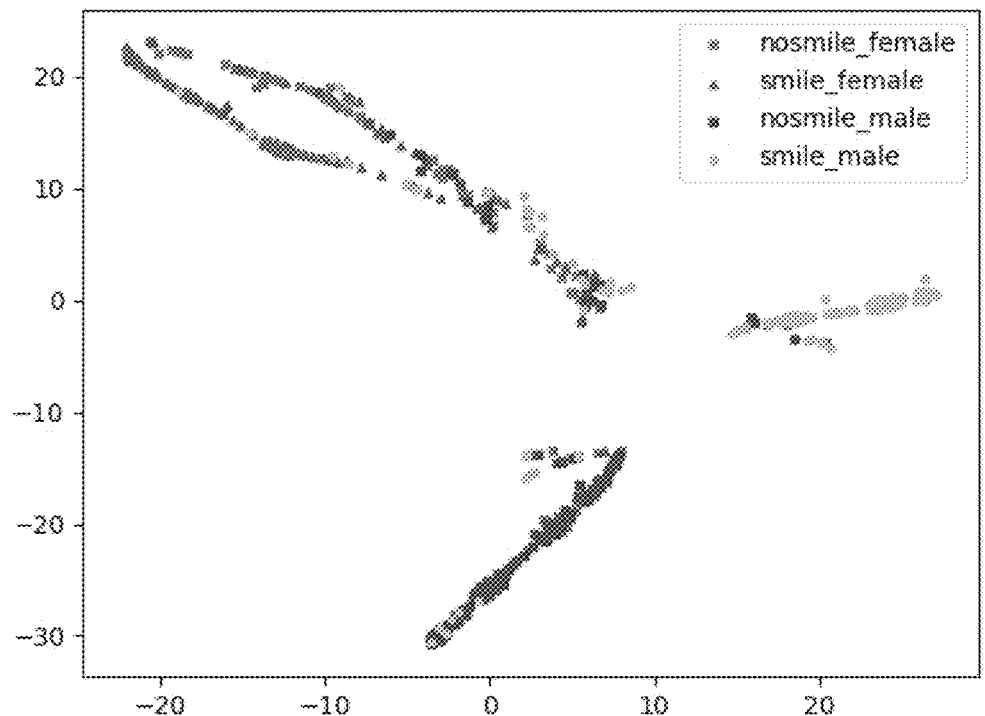

FIG. 6 refers to the representation feature distribution t-SNE visualization map of transformed smile/no smile related fully connected layer $FC_{GIC_s}$ in the method put forward in the invention based on the verification set of the randomly sampled FotW date set.

SPECIFIC IMPLEMENTATION MODE

In order to help the personnel of this invention field to better understand the solution in the application, the following will give a clear and complete description for the technical solution in the embodiment of the application by combining the attached figures. Apparently, the described embodiment is only one of the embodiments in the application, not all of them. Based on the embodiment of the application, all other embodiments acquired by the ordinary technicians in the art without inventiveness, shall be in the protection scope of the application.

What needs illustration is that, the terms "first" and "second" as used in the Description and Claims of the application as well as above-mentioned in the attached figures are used to distinguish similar objects, not to describe specific order or sequence. It should be understood that the data used in such way can be exchanged in the appropriate situation, to describe embodiments of the application herein. In addition, the terms "include" and "possess" intend to cover non-exclusive inclusions, for example, a process, method, system, product or device includes a series of steps or units, it is not necessary to list all steps or unit, instead it means the process, method, system, product or device may include steps or units intrinsic or not listed.

In addition, terms including "installation", "setting", "equipped with", "connection", "connected", "muff-coupling" as used herein shall be understood in the broad sense. For instance, the "connection" can be permanent connection, detachable connection, or monolithic construction; mechanical connection or electrical connection. The "connected" can be directly connected, or connected through intermedium, or internally connected between two devices, components or parts. As to ordinary technical personnel in the field, they can understand the concrete meaning of the above-said terms in the application in accordance with the specific situation.

What needs illustration is that, the embodiment in the application and the features in embodiment can be inter-combined under non-conflict situation. The application will be further illustrated hereinafter in conjunction with the embodiments and attached figure.

A embodiment of the application provides the multi-task learning incorporating dependencies method for bionic eye's face attribute recognition. As shown in FIG. 1, the method includes the steps from S1 to S7:

S1. Determine the first face attribute and the second face attribute for attribute recognition of facial image.

That is face attributes in need of attribute recognition usually includes: attribute in eye, gender, smile, anger, etc. used to describe a certain feature of a person.

S2. According to the said first face attribute and the second face attribute respectively get the first recognition task branch and the second recognition task branch.

That is a recognition task branch corresponding to the recognition of each face attribute will be produced.

S3. Establish the task dependency between the said first recognition task branch and the second recognition task branch.

That is the recognition task branch corresponding to each face attribute is not completely independent, and task dependency can be established between them, to obtain the judgment of a certain face attribute after synthesizing various pairs of face attributes. For example: When smile becomes the face attribute needed to be predicted, there is much difference between men and women for men usually laugh while women usually smile; when a person chuckles, it is of higher probability for women than men to be considered as smile, so the accuracy of prediction for face attribute can be greatly improved by combining gender;

S4. the first transformed face attribute fully connected layer related to the said second face attribute can be obtained in the said first recognition task branch according to the said task dependency. And S5. the second transformed face attribute fully connected layer related to the said first face attribute can be obtained in the said second recognition task branch according to the said task dependency.

S6. Feed the said first transformed face attribute fully connected layer into the prediction layer to predict the first face attribute of the said facial image.

S7. Feed the said second transformed face attribute fully connected layer into the prediction layer to predict the second face attribute of said facial image.

S8. Convolutional neural network for attribute recognition of facial image can be obtained in accordance with the above steps.

In some embodiments, the above-mentioned the multi-task learning incorporating dependencies method for bionic eye's face attribute recognition, the first recognition task branch and the second recognition task branch gained according to the said first face attribute and the second face attribute, which includes:

Determine the sharing layer applicable to all face attributes in the baseline network used for attribute recognition. Specifically, when using ResNet50 as baseline network, the top 46 layers of networks shall be used as the sharing layers for all face attributes;

Determine the first residual block and the second residual block corresponding to the said first face attribute and the second face attribute in baseline network, and then connect them to the sharing layer. Specifically, when using ResNet50 as baseline network, the said first residual block and second residual block are respectively 'res5c1' and 'res5c2';

Determine the first fully connected layer and the second fully connected layer corresponding to the said first face attribute and the second face attribute. Generally speaking, the said first fully connected layer and second fully connected layer are all fully connected layers with 64 expression units;

Connect the said first and second fully connected layers separately to the first and second residual blocks.

In some embodiments, such as the above-mentioned the multi-task learning incorporating dependencies method for bionic eye's face attribute recognition, the task dependency established between the said first recognition task branch and the second recognition task branch, which includes:

Generate the first attention module corresponding to the said first face attribute and the second attention module corresponding to the said second face attribute. Specifically, generate the said first attention module and second attention module by adding attention mechanism;

deal with the said first fully connected layer in accordance with the said second attention module to obtain the first face attribute expression unit related to the said second face attribute. That is to say, the said first fully connected layer is changed, and then the second face attribute can also be incorporated into the said first fully connected layer; And deal with the said second fully connected layer in accordance with the said first attention module to obtain the second face attribute expression unit related to the said first face attribute. In the same way, the said second fully connected layer can also be changed, and then the first face attribute can also be incorporated into the said second fully connected layer;

and then the accuracy can be greatly improved in the recognition of the first face attribute and the second face attribute.

In some embodiments, such as the above-said the multi-task learning incorporating dependencies method for bionic eye's face attribute recognition, the said first fully connected layer is dealt with in accordance with the said first attention module to obtain the first face attribute representation unit related to the said second face attribute, which includes:

Feed all the first face attribute expression units in the said first fully connected layer and the No. i second face attribute expression unit in the second fully connected layer into the No. i second face attribute attention module in the said second attention module to learn the No. i first face attribute expression unit related to the said second face attribute.

Score the relevance between the No. j first face attribute representation unit $x_{Sj}$ in the first fully connected layer $FC_S$ and the No. i second face attribute context unit $C_{Gi}$ in the second fully connected layer in accordance with the following scoring function:

$$\text{score}(x_{S_j}, C_{G_i}) = \tanh(W_S x_{S_j} W_G C_{G_i});$$

In which, the No. i second face attribute context unit $C_{Gi}$ in the said second fully connected layer refers to the No. i second face attribute expression unit $x_{Gi}$ in the said second fully connected layer;

Use probability $P(d_1=j|x_S, C_{G_i})$ to show the relative importance of $x_{Sj}$ based on $C_{Gi}$, in which $d_1$ refers to the importance of $x_s$ based on $C_{Gi}$ of all the first face attribute representation units; In which $P(d_1=j''x_S, C_{G_i})$ can be calculated using relevance scoring function in accordance with the following equation:

$$P(d_1 = j \mid x_S, C_{G_i}) = \frac{\exp(\text{score}(x_{S_j}, C_{G_i}))}{\sum_{j=1}^{K} \exp(\text{score}(x_{S_j}, C_{G_i}))};$$

$P(d_1|x_S, C_{G_i})$ refers to importance probability distribution, and it can be calculated as follows:

$$P(d_1|x_s, C_{G_i}) = [P(d_1=j|x_s, C_{G_i})]_{j=1}^{64};$$

The first face attribute representation unit related to the No. i said second face attribute in the first transformed face attribute $\hat{S}_i$ fully connected layer $FC_{SIC_G}$ can be calculated in accordance with the following formula:

$$\hat{S}_i = E_{x_S \sim P(d_1|x_S, C_{G_i})}(x_S) = \sum_{j=1}^{64} P(d_1 = j \mid x_S, C_{G_i}) x_{S_j}。$$

In some embodiments, such as the above-said multi-task learning incorporating dependencies method for bionic eye's face attribute recognition, the said first fully connected layer is dealt with in accordance with the said first attention module to obtain the second face attribute expression unit related to the said first face attribute, which includes:

Feed all the second face attribute expression units into the said second fully connected layer and the No. i second face attribute expression unit in the first fully connected layer into the No. i first face attribute attention module in the said first attention module to learn the second face attribute expression unit related to the No. i said first face attribute. which includes:

Score the relevance between the No. j second face attribute representation unit $x_{Gj}$ in the second fully connected layer $FC_G$ and the No. i first face attribute context unit $C_{Si}$ in the first fully connected layer in accordance with the following scoring function:

$$\text{score}(x_{G_j}, C_{S_i}) = \tanh(W_G x_{G_i} + W_{S_i});$$

In which, the No. i first face attribute context unit G in the said first fully connected layer refers to the No. i first face attribute expression unit $x_{Si}$ in the said first fully connected layer;

Use probability $P(d_2=j|x_G, C_{S_i})$ to show the relative importance of $x_{Gj}$ based on $C_{Si}$, in which $d_2$ refers to the importance of $x_G$ based on $C_{Si}$ of all the second face attribute representation units: In which, $P(d_2=j|x_G, C_{S_i})$ can be calculated using relevance scoring function in accordance with the following equation:

$$P(d_2 = j \mid x_G, C_{S_i}) = \frac{\exp(\text{score}(x_{G_j}, C_{S_i}))}{\sum_{j=1}^{K} \exp(\text{score}(x_{G_j}, C_{S_i}))};$$

$P(d|x_G, C_{S_i})$ refers to importance probability distribution, and it can be calculated as follows:

$$P(d_2|x_G, C_{S_i}) = [P(d_2=j|x_G, C_{S_i})]_{j=1}^{64};$$

The second face attribute representation unit related to the No. i said second face attribute $\hat{G}_i$ in the second transformed face attribute fully connected layer $FC_{GIC_S}$ can be calculated in accordance with the following formula:

$$\hat{G}_i = E_{x_G \sim P(d_2|x_G, C_{S_i})}(x_G) = \sum_{j=1}^{64} P(d_2 = j | x_G, C_{S_i}) x_{G_j} \circ$$

In some embodiments, like the multi-task learning incorporating dependencies method for bionic eye's face attribute recognition, the first transformed face attribute fully connected layer related to the said second face attribute can be obtained in accordance with task dependency in the said first recognition task branch, and the second transformed face attribute fully connected layer related to the said first face attribute can be obtained in accordance with task dependency in the said second recognition task branch, which includes:

Connect the first face attribute representation units related to all the said second face attributes to generate the first transformed fully connected layer, and then use the said first transformed face attribute fully connected layer as the first transformed face attribute fully connected layer.

Connect the second face attribute representation units related to all the said first face attributes to generate the second transformed fully connected layer, and then use the said second transformed face attribute fully connected layer as the first transformed face attribute fully connected layer.

In some embodiments, like the multi-task learning incorporating dependencies method for bionic eye's face attribute recognition, the said first transformed face attribute fully connected layer is fed into prediction layer to predict the first face attribute of the said facial image, and then the said second transformed face attribute fully connected layer is fed into prediction layer to predict the second face attribute of the said facial image, which includes:

Predict the first face attribute by feeding the said first transformed face attribute fully connected layer into softmax layer, and then obtain the first face attribute prediction probability.

Predict the second face attribute by feeding the said second transformed face attribute fully connected layer into softmax layer, and then obtain the second face attribute prediction probability.

In some embodiments, like the multi-task learning incorporating dependencies method for bionic eye's face attribute recognition after obtaining the convolutional neural network, the following is also included:

The said convolutional neural network is entered into the training set, and then the first recognition task branch and the second recognition task branch are trained by cross entropy loss function. The loss function equation Ls related to the said first recognition task branch is shown as follows:

$$L_S = -s \cdot \log(p_s) - (1-s) \cdot \log(1-p_s);$$

$\rho_s$ refers to the probability of one facial image predicted by the first face attribute in the said training set; s refers to judging information about the first face attribute in the said facial image, which is 0 or 1;

And the loss function equation $L_G$ related to the said second recognition task branch is shown as below:

$$L_G = -g \cdot \log(p_g) - (1-g) \cdot \log(1-p_g);$$

$\rho_g$ refers to the probability of one facial image predicted by the second face attribute in the said training set; g refers to judging information about the second face attribute in the said facial image, which is 0 or 1;

Obtain the total loss function equation L by weighting the said loss functions $L_S$ and $L_G$, which is shown below:

$$L = \lambda_s \cdot L_S + \lambda_g \cdot L_G;$$

$\lambda_s$ and $\lambda_g$ are weighting parameters corresponding to smile recognition and gender recognition.

And then the above-mentioned target function can be used to train the obtained network to make the neural network iterate, and finally generate a model used to conduct face attribute recognition on image.

As shown in FIG. 2, the application case used in the above embodiments includes the following steps:

1. Change facial image into the image with the size of 224×223 for network input, and all the entered images are color image with the size of 224×224×3.

2. Provide parameters of top 46 layers for all tasks by using ResNet50 as the baseline network. When the first face attribute and the second face attribute in the face attribute recognition task are respectively smile and gender, the network will divide the smile and gender recognition into two special task branches. Connect the fully connected layer $FC_S$ with 64 smile/no smile expression units and fully connected layer $FC_G$ with 64 gender expression units to 'res5c1' and 'res5c2', in which 'res5c1' and 'res5c2' corresponds to residual blocks in the ResNet50 network.

3. Design the gender context attention module and smile/no smile context attention module, and transform fully connected layer $FC_S$ and fully connected layer $FC_G$. The No. i (i=1,2, . . . ,64) gender related smile/no smile representation unit is learned by entering the smile/no smile representation unit in fully connected layer $FC_S$ and the No. i) gender context unit $C_{G_i}$ into the No. i (i=1,2, . . . ,64) gender context attention module Att_$C_{G_i}$. Specifically, the said context unit $C_{G_i}$ refers to all the $x_{G_i}$ in the said fully connected layer $FC_G$; The No. i (i=1,2, . . . ,64) gender related smile/no smile representation unit $\hat{S}_i$ is learned by feeding the gender representation unit in fully connected layer $FC_G$ and the No. i (i=1,2, . . . ,64) smile context unit $C_{S_i}$ into the No. i (i=1, 2, . . . ,64) gender context attention module.

(1) The No. i gender context unit $C_{G_i}$ corresponds to the No. i gender representation unit in fully connected layer $FC_G$, and the scoring function equation to score the relevance between No. j smile/no smile representation unit $x_{S_j}$ in fully connected layer $FC_S$ and the No. i gender context unit $C_{G_i}$ is shown in formula (1).

$$\text{score}(x_{S_j}, C_{G_i}) = \tanh(W_S x_{S_j} + W_G C_{G_i}) \tag{1}$$

(2) Use probability $P(d=j|x_S, C_{G_i})$ to show the relative importance of $x_{S_j}$ based on $C_{G_i}$, in which d is like an index representing the importance based on $C_{G_i}$ for each unit in 64 units. $P(d=j|x_S, C_{G_i})$ relevance function can be used in the calculation with the following formula, as shown in formula (2).

$$P(d = j | x_S, C_{G_i}) = \frac{\exp(\text{score}(x_{S_j}, C_{G_i}))}{\sum_{j=1}^{K} \exp(\text{score}(x_{S_j}, C_{G_i}))} \tag{2}$$

(3) Importance probability distribution $P(d|x_S, C_{G_i})$ is shown in formula (3).

$$P(d|x_S, C_{G_i}) = [P(d=j|x_S, C_{G_i})]_{j=1}^{64} \tag{3}$$

4. Connect 64 gender-related smile/no smile expression units $\hat{S}_i$ to generate the transformed gender-related fully connected layer $FC_{S|C_G}$; connect 64 smile/no smile-related gender expression units $\hat{G}_i$ to generate the transformed smile/no smile-related fully connected layer $FC_{GIC_s}$.

(1) The No. i gender-related smile/no smile representation unit $\hat{S}_i$ in transformed gender-related fully connected layer $FC_{GIC_G}$ can be calculated in accordance with formula (4);

$$\hat{S}_i = E_{x_S \sim P(d|x_S, C_{G_i})}(x_S) = \sum_{j=1}^{64} P(d=j|x_S, C_{G_i})x_{S_j} \quad (4)$$

(2) The No. i smile/no smile-related gender representation unit $\hat{G}_i$ in transformed smile/no smile-related fully connected layer $FC_{GIC_s}$ can be calculated in the similar way of $\hat{S}_i$. $\hat{G}_i$ can be calculated in accordance with formula (5), (6), (7), (8).

$$\text{score}(x_{G_j}, C_{S_i}) = \tanh(W_G x_{G_j} + W_S C_{S_i}) \quad (5)$$

$$P(d=j|x_G, C_{S_i}) = \frac{\exp(\text{score}(x_{G_j}, C_{S_i}))}{\sum_{j=1}^{K} \exp(\text{score}(x_{G_j}, C_{S_i}))} \quad (6)$$

$$P(d|x_G, C_{S_i}) = [P(d=j|x_G, C_{S_i})]_{j=1}^{64} \quad (7)$$

$$\hat{G}_i = E_{x_G \sim P(d|x_G, C_{S_i})}(x_G) = \sum_{j=1}^{64} P(d=j|x_G, C_{S_i})x_{G_j} \quad (8)$$

5. Feed the transformed gender related fully connected layer $FC_{SIC_G}$ into softmax layer to predict the final smile/no smile; feed the transformed smile/no smile related fully connected layer $FC_{GIC_s}$ into softmax layer to predict the final gender.

6. Train smile and gender recognition tasks with cross entropy loss function, and the loss function $L_s$ is shown as formula (9):

$$L_S = -s \cdot \log(p_s) - (1-s) \cdot \log(1-p_s) \quad (9)$$

$\rho_s$ refers to the probability of the final input of smile. s=1 refers to smile, while s=0 refers to no smile;

Loss function $L_G$ is shown as formula (10):

$$L_G = -g \cdot \log(p_g) - (1-g) \cdot \log(1-p_g) \quad (10)$$

$\rho_g$ refers to the probability of the final input of female. g=1 refers to female, while g=0 refers to male.

Total loss function L is the weighted sum of loss function $L_S$ and $L_G$, as shown in formula (11):

$$L = \lambda_s \cdot L_s + \lambda_g \cdot L_G \quad (11)$$

Divide the (smile/no smile×gender) combination into four groups, and randomly select 100 pictures in the verification set of FotW date set for each group. FIG. 3 to FIG. 6 show the representation feature distribution of fully connected layer $FC_S$, the transformed gender-related fully connected layer $FC_{SIC_G}$, fully connected layer $FC_G$ and the transformed smile/no smile-related fully connected layer $FC_{GIC_s}$ by t-SNE visualization of the randomly sampled date set.

The network for separate prediction of final smile/no smile and gender by directly feeding fully connected layers $FC_S$ and $FC_G$ into softmax layer is called traditional multi-task learning network.

Table 1 shows the result comparison between the method put forward in the invention and traditional multi-task learning network on FotW and LFWA date sets.

TABLE 1

| Method | FotW | | LFWA | |
|---|---|---|---|---|
| | Smile | Gender | Smile | Gender |
| Traditional multi-task learning network | 86.83% | 82.54% | 90.74% | 91.80% |
| Method put forward in the invention | 88.53% | 84.83% | 91.13% | 92.49% |

The comparison results and the t-SNE visualization map demonstrate the effectiveness of the multi-task learning incorporating dependencies method for bionic eye's face attribute recognition What needs illustration is that, steps of flow diagram in attached figures can be executed in a computer system such as a set of computer executable instructions. Although the logic sequence is shown in the flow diagram, steps can be executed in an order different from that herein in some cases.

The embodiment of the invention also provides the multi-task learning incorporating dependencies method for bionic eye's face attribute recognition by the above method. As shown in FIG. 2, the convolutional neural network includes:

Sharing layer 1, providing parameters of the top 46 layers for all tasks by using ResNet50 as the baseline network. That is, the said sharing layer 1 includes the Internet of 46 layers.

Task branch layer 2 is used for determining the first face attribute and second face attribute for attribute recognition of facial image. And According to the said first face attribute and the second face attribute respectively get the first recognition task branch and the second recognition task branch.

Relevance establishing layer is used to establish task dependency between the said first recognition task branch and the second recognition task branch;

The transformed face attribute fully connected layer 4 is used for the first transformed face attribute fully connected layer related to the said second face attribute in accordance with task dependency; And Obtain the second transformed face attribute fully connected layer related to the said first face attribute in accordance with the said task dependency;

Prediction layer 5 is used for feeding the said first transformed face attribute fully connected layer into prediction layer to predict the first face attribute of the said facial image. And feed the said second transformed face attribute fully connected layer into the prediction layer to predict the second face attribute of the said facial image.

Obviously, technicians in this field should understand that the modules or steps of the invention can be achieved by the general computing device, which can be integrated in a single computing device or distributed on the network composed of several computing devices. Optionally, they can be achieved by executable codes of computing devices to be stored in a storing device for execution by a computing device. Or they can be made into integrated circuit modules or make multiple modules or steps of them into a single integrated circuit module for implementing. In this way, the invention is not restricted to the combination of any specific hardware and software.

The above said is only the preferred embodiments of the application, but not to limit the application. The technicians in this field can variedly modify and change the application. Any modifications, equivalent substitutions, improvements, etc. made within the spirit and principles of the application shall be included within the protective scope of the application.

What is claimed is:

1. The multi-task learning incorporating dependencies method for bionic eye's face attribute recognition including:
   determine a first face attribute and a second face attribute for attribute recognition of facial image,
   according to the first face attribute and the second face attribute respectively get a first recognition task branch and a second recognition task branch,
   establish the task dependency between the first recognition task branch and the second recognition task branch, including: generate the first attention module corresponding to the first face attribute and the second attention module corresponding to the second face attribute; deal with the first fully connected layer in accordance with the second attention module to obtain the first face attribute representation unit related to the second face attribute; and deal with the second fully connected layer in accordance with the first attention module to obtain the second face attribute representation unit related to the first face attribute,
   the first transformed face attribute fully connected layer related to the second face attribute is obtained in the first recognition task branch according to the task dependency, and
   the second transformed face attribute fully connected layer related to the first face attribute is obtained in the second recognition task branch according to the task dependency,
   feed the first transformed face attribute fully connected layer into a prediction layer to predict the first face attribute of the facial image, and feed the second transformed face attribute fully connected layer into the prediction layer to predict the second face attribute of the facial image,
   convolutional neural network for attribute recognition of facial image is obtained in accordance with the above steps.

2. The multi-task learning incorporating dependencies method for bionic eye's face attribute recognition according to claim 1, wherein the first recognition task branch and the second recognition task branch gained according to the first face attribute and the second face attribute, which includes:
   determine the sharing layer applicable to all face attributes in the baseline network used for attribute recognition,
   determine the first residual block and the second residual block corresponding to the first face attribute and the second face attribute in baseline network, and then connect them to the sharing layer,
   determine the first fully connected layer and the second fully connected layer corresponding to the first face attribute and the second face attribute,
   connect the first and second fully connected layers separately to the first and second residual blocks.

3. The multi-task learning incorporating dependencies method for bionic eye's face attribute recognition according to claim 1, wherein the first fully connected layer is dealt with in accordance with the second attention module to obtain the first face attribute representation unit related to the second face attribute, which includes:
   feed all the first face attribute representation units in the first fully connected layer and the i-th second face attribute representation unit in the second fully connected layer into the i-th second face attribute attention module in the second attention module to learn the i-th first face attribute representation unit related to the second face attribute.

4. The multi-task learning incorporating dependencies method for bionic eye's face attribute recognition in claim 1, wherein the second fully connected layer is dealt with in accordance with the first attention module to obtain the second face attribute representation unit related to the first face attribute, which includes:
   feed all the second face attribute representation units in the second fully connected layer and the i-th first face attribute representation unit in the first fully connected layer into the i-th first face attribute attention module in the first attention module to learn the i-th second face attribute expression unit related to the first face attribute.

5. The multi-task learning incorporating dependencies method for bionic eye's face attribute recognition according to claim 3, wherein is the first transformed facial attribute fully connected layer related to the said second face attribute is obtained in accordance with task dependency in the first recognition task branch, which includes:
   concatenate the first face attribute representation units related to all the second face attributes to generate the first transformed face attribute fully connected layer.

6. The multi-task learning incorporating dependencies method for bionic eye's face attribute recognition according to claim 4, wherein the second transformed facial attribute fully connected layer related to the first face attribute is obtained in accordance with task dependency in the second recognition task branch, which includes:
   concatenate the second face attribute representation units related to all the first face attributes to generate the second transformed face attribute fully connected layer.

7. The multi-task learning incorporating dependencies method for bionic eye's face attribute recognition according to claim 5, wherein the first transformed face attribute fully connected layer is fed into the prediction layer to predict the first face attribute of facial images, which includes:
   predict the first face attribute by feeding the first transformed face attribute fully connected layer into softmax layer, and then obtain the first face attribute prediction probability.

8. The multi-task learning incorporating dependencies method for bionic eye's face attribute recognition according to claim 6, wherein the second transformed face attribute fully connected layer is fed into the prediction layer to predict the second face attribute of facial images, which includes:
   predict the second face attribute by feeding the second transformed face attribute fully connected layer into softmax layer, and then obtain the second face attribute prediction probability.

9. The multi-task learning incorporating dependencies method for bionic eye's face attribute recognition according to claim 3, wherein all the first face attribute representation units in the first fully connected layer and the i-th second face attribute representation unit in the second fully connected layer are entered into the i-th second face attribute attention module in the second attention module to learn the i-th first face attribute representation unit related to the second face attribute, which include:
   score the relevance between the j-th first face attribute representation unit $x_{sj}$ in the first fully connected layer FCs and the i-th second face attribute context unit $C_{Gi}$ in the second fully connected layer in accordance with the following scoring function:

$$score(x_{S_j}, C_{G_i}) = \tanh(W_S x_{S_j} + W_G C_{G_i}),$$

in which, the i-th second face attribute context unit $C_{Gi}$ in the second fully connected layer refers to the i-th second face attribute expression unit $x_{Gi}$ in the second fully connected layer, use probability $P(d_1=j|x_S, C_{G_i})$ to show the relative importance of $x_{sj}$ based on $C_{Gi}$, in which $d_1$ refers to the importance of $x_s$ based on $C_{Gi}$ of all the first face attribute representation units, in which $P(d_1=j|X_S, C_{G_i})$ is calculated using relevance scoring function in accordance with the following equation:

$$P(d_1 = j \mid x_S, C_{G_i}) = \frac{\exp(score(x_{S_j}, C_{G_i}))}{\sum_{j=1}^{K} \exp(score(x_{S_j}, C_{G_i}))},$$

$P(d_1|x_S, C_{G_i})$ refers to importance probability distribution, and it is calculated as follows:

$$P(d_1|x_S, C_{G_i}) = [P(d_1=j|x_S, C_{G_i})]_{j=1}^{64},$$

the first face attribute representation unit related to the i-th second face attribute $\hat{S}_i$ in the first transformed face attribute fully connected layer $FC_{S|C_G}$ is calculated in accordance with the following formula:

$$\hat{S}_i = E_{x_S \sim P(d_1|x_S, C_{G_i})}(x_S) = \sum_{j=1}^{64} P(d_1 = j \mid x_S, C_{G_i}) x_{S_j}.$$

10. The multi-task learning incorporating dependencies method for bionic eye's face attribute recognition according to claim 3, wherein all the second face attribute representation units in the second fully connected layer and the i-th first face attribute representation unit in the first fully connected layer are fed into the i-th first face attribute attention module in the first attention module to learn the second face attribute representation unit related to the i-th said first face attribute, which include:

score the relevance between the j-th second face attribute representation unit $x_{Gj}$ in the second fully connected layer $FC_G$ and the i-th first face attribute context unit $C_{si}$ in the first fully connected layer in accordance with the following scoring function:

$$score(x_{G_j}, C_{S_i}) = \tanh(W_G x_{G_j} + W_S C_{S_i});$$

in which, the i-th first face attribute context unit $C_{si}$ in the first fully connected layer refers to the i-th first face attribute representation unit $x_{S_i}$ in the first fully connected layer, use probability $P(d_2=j|x_G, C_{S_i})$ to show the relative importance of $x_{Gj}$ based on $C_{si}$, in which $d_2$ refers to the importance of $x_G$ based on $C_{si}$ of all the second face attribute representation unit, in which $P(d_2=j|x_G, C_{S_i})$ is calculated using relevance scoring function in accordance with the following equation:

$$P(d_2 = j \mid x_G, C_{S_i}) = \frac{\exp(score(x_{G_j}, C_{S_i}))}{\sum_{j=1}^{K} \exp(score(x_{G_j}, C_{S_i}))},$$

$P(d|x_G, C_{S_i})$ refers to importance probability distribution, and it is calculated as follows:

$$P(d_2|x_G, C_{S_i}) = [P(d_2=j|x_G, C_{S_i})]_{j=1}^{64},$$

the second face attribute representation unit related to the i-th first face attribute $\hat{G}_i$ in the second transformed face attribute fully connected layer $FC_{G|C_S}$ is calculated in accordance with the following formula:

$$\hat{G}_i = E_{x_G \sim P(d_2|x_G, C_{S_i})}(x_G) = \sum_{j=1}^{64} P(d_2 = j \mid x_G, C_{S_i}) x_{G_j}.$$

11. The multi-task learning incorporating dependencies method for bionic eye's face attribute recognition in claim 1, wherein after obtaining convolutional neural network, it also includes:

enter training set into the convolutional neural network and then train it by constructing loss function.

12. The multi-task learning incorporating dependencies method for bionic eye's face attribute recognition in claim 1, wherein training the convolutional neural network by constructing loss function, which includes:

train the first recognition task branch and the second recognition task branch with cross entropy loss function, and the loss function Ls related to the first recognition task branch is shown in the equation below:

$$L_S = -s \cdot \log(p_s) - (1-s) \cdot \log(1-p_s),$$

$p_s$ refers to the probability of one facial image predicted by the first face attribute in the training set; s refers to judging information about the first face attribute in the facial image, which is 0 or 1, and the loss function equation $L_G$ related to the second recognition task branch is shown as below:

$$L_G = -g \cdot \log(p_g) - (1-g) \cdot \log(1-p_g),$$

$p_g$ refers to the probability of one facial image predicted by the second face attribute in the training set, g refers to judging information about the second face attribute in the facial image, which is 0 or 1, obtain the total loss function equation L by weighting the loss functions Ls and $L_G$, which is shown below:

$$L = \lambda_s \cdot L_S + \lambda_g \cdot L_G,$$

$\lambda_s$ and $\lambda_g$ are weighting parameters corresponding to smile recognition and gender recognition.

13. The multi-task learning incorporating dependencies network for bionic eye's face attribute recognition, comprising:

task branch layer used in determining the first face attribute and the second face attribute for attribute recognition of facial image, and according to the first face attribute and the second face attribute respectively get the first recognition task branch and the second recognition task branch, relevance establishing layer is used to establish task dependency between the first recognition task branch and the second recognition task branch, including: generate the first attention module corresponding to the first face attribute and the second attention module corresponding to the second face attribute; deal with the first fully connected layer in accordance with the second attention module to obtain the first face attribute representation unit related to the second face attribute; and deal with the second fully connected layer in accordance with the first attention module to obtain the second face attribute representation unit related to the first face attribute, the transformed face attribute fully connected layer refers to the first transformed face attribute fully connected layer related to the second face attribute in accordance with task dependency, and obtain the second transformed face attribute fully connected layer related to the first face attribute in accordance with the task dependency, prediction layer for feeding the first transformed face attribute fully connected layer into the prediction layer to predict the first face attribute of the facial image, and feed the second transformed face attribute fully connected layer into the prediction layer to predict the second face attribute of the facial image.

\* \* \* \* \*